United States Patent [19]
Edmundson

[11] Patent Number: 4,980,593
[45] Date of Patent: Dec. 25, 1990

[54] DIRECT CURRENT DYNAMOELECTRIC MACHINES UTILIZING HIGH-STRENGTH PERMANENT MAGNETS

[75] Inventor: William C. Edmundson, Anderson, Ind.

[73] Assignee: The Balbec Corporation, New York, N.Y.

[21] Appl. No.: 317,859

[22] Filed: Mar. 2, 1989

[51] Int. Cl.⁵ .................. H02K 1/10; H02K 21/26; H02K 23/04
[52] U.S. Cl. .................................. 310/154; 310/186
[58] Field of Search ............. 310/154, 152, 185, 186, 310/190, 191, 177, 209, 254, 192

[56] References Cited

U.S. PATENT DOCUMENTS

| | | | |
|---|---|---|---|
| 1,237,272 | 8/1917 | Arendt | 310/186 |
| 3,054,916 | 9/1962 | Cobb | 310/154 |
| 3,253,194 | 5/1966 | Parker . | |
| 3,553,509 | 1/1969 | Schellekens | 310/154 |
| 3,594,599 | 7/1971 | West | 310/258 |
| 3,810,056 | 5/1974 | Jereb | 335/302 |
| 3,939,371 | 2/1976 | Murakami | 310/154 |
| 4,031,419 | 6/1977 | Spiesberger et al. | 310/49 R |
| 4,075,437 | 2/1978 | Chin et al. | 179/114 R |
| 4,091,300 | 5/1978 | Lynch et al. | 310/154 |
| 4,104,787 | 8/1978 | Jandeska et al. | 29/596 |
| 4,110,718 | 8/1978 | Odor et al. | 310/154 |
| 4,151,435 | 4/1979 | Jandeska et al. | 310/154 |
| 4,216,400 | 8/1980 | Lynch et al. | 310/154 |
| 4,217,513 | 8/1980 | Kohzai et al. | 310/154 |
| 4,237,397 | 12/1980 | Mohr et al. | 310/154 |
| 4,322,646 | 3/1982 | Persson | 310/154 |
| 4,435,664 | 3/1984 | Boesel | 310/186 |
| 4,453,097 | 6/1984 | Lordo | 310/154 |
| 4,464,595 | 8/1984 | Hamano et al. | 310/154 |
| 4,471,252 | 9/1984 | West | 310/154 |
| 4,510,407 | 4/1985 | Tomite | 310/154 |
| 4,516,046 | 5/1985 | Mercier | 310/154 |
| 4,521,709 | 6/1985 | Saint-Michel et al. | 310/186 |
| 4,554,474 | 11/1985 | Morishita et al. | 310/154 |
| 4,639,625 | 1/1987 | Abukawa et al. | 310/154 |
| 4,794,291 | 12/1988 | Abukawa et al. | 310/154 |
| 4,827,173 | 5/1989 | Corbach et al. | 310/154 |
| 4,899,074 | 2/1990 | West | 310/154 |

FOREIGN PATENT DOCUMENTS

| | | |
|---|---|---|
| 34460 | 8/1981 | European Pat. Off. . |
| 173917 | 3/1986 | European Pat. Off. ............ 310/177 |
| 1018137 | 10/1957 | Fed. Rep. of Germany . |
| 1978272 | 2/1968 | Fed. Rep. of Germany . |
| 3737603 | 5/1988 | Fed. Rep. of Germany . |
| 1118604 | 7/1968 | United Kingdom ................ 310/154 |
| 2110478 | 6/1983 | United Kingdom . |

OTHER PUBLICATIONS

Technische Rundschau, "Wo liegen die Chancen des Permanentmagnetmotors", No. 24, 14 Jun. 1983, p. 25, B. Ulrich.

Machine Design, "Neodymium Breaks the Mold for Magnets", vol. 58, No. 22, 25 Sep. 1986, pp. 67–70; W. F. Bleeke.

Patent Abstracts of Japan, vol. 10, No. 5, 10 Jan. 1986.

*Primary Examiner*—Steven L. Stephan
*Assistant Examiner*—Clayton E. LaBalle
*Attorney, Agent, or Firm*—Sixbey, Friedman, Leedom & Ferguson

[57] ABSTRACT

A direct current dynamoelectric machine is disclosed including plural main poles on a field frame with a wound armature rotatably mounted therein. The main poles utilize high-strength permanent magnets which are thick enough to supply a magnetic field, but having means at an edge portion thereof (such as at the trailing edge on a D.C. motor) for increasing the air gap towards that edge to resist demagnetization resulting from armature reaction. Particularly, the permanent magnets of the main poles include a concentric portion of constant thickness and a flared portion of the same constant thickness, wherein the flared portion joins the concentric arc portion in a tangential manner. The dynamoelectric machine also includes permanent magnet interpoles between the main poles, wherein each permanent magnet for each interpole is supported nearby the armature surface by a means that is magnetically nonconductive so that flux from the permanent magnet interpole is limited by an effectively large air gap to a value appropriate for the strength of an interpole.

38 Claims, 6 Drawing Sheets

DIRECT CURRENT DYNAMOELECTRIC MACHINES UTILIZING HIGH-STRENGTH PERMANENT MAGNETS

TECHNICAL FIELD

The present invention relates to direct current dynamoelectric machines utilizing thin high-strength permanent magnets for main poles and/or interpoles. Particularly, the main poles include thin, shaped permanent magnets to resist demagnetization force as a result of armature reaction, and the interpoles include thin permanent magnets with an air gap from the field frame to effectively counter armature reaction in the commutating zone and reduce sparking between the commutator and the brushes over a relatively wide useful load rang of the dynamoelectric machine.

BACKGROUND OF THE INVENTION

Permanent magnet dynamoelectric machines, per se, are, of course, well known in the art, wherein relative rotation occurs between a stator and an armature. On such machines one of the stator and armature includes a plurality of permanent magnet poles, and the other has windings of electrically conductive wire. Normally, the stator has the permanent magnets mounted thereon, and the wound armature is rotated within the stator.

Between the armature and the stator poles, an air gap is maintained, whereby the magnetic field of the permanent magnets acts with a field generated by the supply of electricity to the electrically conductive armature windings to produce rotary motion in a DC motor, or with rotary motion supplied to the armature to induce current within the armature windings in a generator. In the motor, the current flow in the armature windings forces the relative motion between the stator and the armature, whereas in the generator, relative motion within the stationary field generates current.

When a dynamoelectric machine armature has current flowing through its conductive windings, a magnetic flux is built up around the conductors to produce a second magnetic field in the space between the stator and the armature. The effect of the resultant combined magnetic field is the distortion of the main field. This distortion is know n as armature reaction. Moreover, the armature reaction varies depending on the amount of armature current flowing in the conductors, known as the load, and the direction of current flow. The larger the current flow or load, the greater the armature reaction.

The armature reaction affects the permanent magnetic poles along their interior circumferential pole face by increasing the magnetic flux density toward one edge thereof while decreasing the magnetic flux density toward the other edge. The edges referred to are those encountered in the direction of rotation of the armature, wherein the first edge encountered is the leading edge and the second edge is the trailing edge. In a D.C. motor, the flux density of the leading edge is increased while the trailing edge flux is decreased. In a D.C. generator, the opposite is true. This decrease of magnetic flux at either the leading or trailing edge, if excessive, will result in a demagnetization of the permanent magnet material at that edge.

In order to prevent the demagnetization of the permanent magnet material resultant from armature reaction in dynamoelectric machines, it is well-known to utilize magnets that have a sufficient strength at the edges thereof so as not to be demagnetized by the armature reaction. Typically, techniques for designing the magnets to resist demagnetization include increasing the thickness of the magnet throughout in the radial direction, and/or reducing the circumferential length of the magnets. The total length of the flux path due to the armature reaction, including the magnet thickness and the air gap, must counter or use up the demagnetization force. However, these techniques disadvantageously result in increased machine size and weight, along with a decrease in machine efficiency.

It is also known, in a manner to resist demagnetization, to include additional elements such as shields or plates on or attached with the permanent magnets. See, for example, U.S. Pat. No. 4,471,252 dated Sept. 11, 1984 to West. Disclosed in West is a dynamoelectric machine with permanent magnets modified by the addition of shields provided within a recessed portion in the pole face of each permanent magnet while maintaining a constant air gap width between the rotor and the stator. The shield functions to redistribute the flux density in the part of the pole covered by the shield to resist demagnetization.

Another similar machine is disclosed in U.S. Pat. No. 4,639,625 to Abukawa et al., dated Jan. 27, 1987. The D.C. machine includes permanent magnets with high saturation magnetic flux density plates secured in recesses thereon, wherein the magnets and plates together define a substantially constant circumferential air gap between the poles and a rotor. The above Abukawa et al. patent and U.S. Pat. No. 4,554,474 dated Nov. 19, 1985 to Morishita et al further disclose the use of auxiliary poles on the leading edge side of a permanent magnet pole of a D.C. dynamoelectric machine.

A different attempt for providing a permanent magnet which resists demagnetization in a dynamoelectric machine is disclosed in U.S. Pat. No. 4,110,718 to Odor et al., wherein each permanent magnet pole comprises a composite magnet with the material at the demagnetization edge (i.e., the trailing edge) is made of a magnetic material having high coercive force.

These known devices disadvantageously require production by processes including additional steps in the preparation of recesses, the attachment of plates or shields, and the formation of composite magnets. Such processes also disadvantageously increase associated manufacturing costs without significant improvement in the reduction of dynamo size and weight.

With the introduction of high-strength permanent magnets, such as disclosed in U.S. Pat. Nos. 4,104,787 and 4,151,435 to Jandeska et al., dated Aug. 8, 1978 and Apr. 24, 1979, respectively, it has become increasingly possible to reduce dynamoelectric machine size. These smaller dynamos are particularly found to be useful in an automotive environment such as an automotive window controller. How ever, to compensate for demagnetization from armature reactance flux, it is still necessary that the magnets be thick enough to resist demagnetization force. The increased thickness of such magnetized material is extremely costly, even though the magnet is overall very thin. Likewise, U.S. Pat. No. 4,453,097 to Lordo, dated June 5, 1984, utilizes high-strength permanent magnets which rely on the high coercive force of the magnet material to resist the armature reaction field, without modifying the magnets. In other words, the magnets have a sufficient and constant thickness to resist demagnetization.

Clearly then, there is a need for a high-strength permanent magnet which sufficiently resists demagnetization flux from armature reaction at the edges thereof, provides a strong field for torque or current production, and minimizes the costs of production and material associated with high-strength permanent magnets.

Another effect of the armature reaction is the shifting of the neutral plane of the dynamoelectric machine when the machine is loaded. As before, loaded refers to the supply or generation of current in the conductive windings of the armature when used as a motor or generator respectively.

In a D.C. motor, direct current is supplied to the armature windings conventionally by brushes and a commutator. The purpose of the brushes and commutator is to switch current direction to the armature windings (as is well known), but they also necessarily short circuit the loop passing through the neutral plane. It is desirable that the brush short circuit that loop at the instant it lies within the neutral plane, so that during commutation there is a minimum interaction with the field flux in the loop and the potential difference across the loop is at a minimum. When the short circuiting is at the neutral plane, sparking between the brushes and the commutator is effectively reduced or eliminated, thereby greatly increasing brush and commutator life. However, the armature reaction, as noted above, shifts the neutral plane to a degree depending proportionally to the load applied to the armature windings. In a D.C. motor, the direction of the shift is opposite to the direction of rotation of the armature. But, to achieve perfect commutation, it is necessary that the axis of the brushes coincides with the axis of the neutral plane. Therefore, as the dynamoelectric machine is loaded, either the brush axis has to be moved to the new position of the neutral plane, or something must prevent the neutral plane from moving.

It is the well known practice in the art to employ interpoles in the commutating zone between the main field poles of a dynamoelectric machine. Such interpoles are comprised of magnetically permeable poles (same as the field frame) connected to or integral with the field frame in line with the neutral plane between the main poles, wherein the interpoles include windings for producing a magnetic field having a corrective magnetic flux to counteract the induced voltages in the armature coils to be commutated. Interpole windings are connected in series with the armature windings, so that the armature current causes the interpole windings to set up magnetic fields around the armature. Moreover, the interpole fields are set up to cancel and even slightly overpower the effect of armature reaction, and to increase or decrease proportionally to the armature reaction as armature current is increased or decreased. In other words, the wound interpoles are self-regulating.

Examples of dynamoelectric machines utilizing interpoles connected in series with armature windings are disclosed in Boesel U.S. Pat. Nos. 4,435,664 dated Mar. 6, 1984, and Mercier U.S. Pat. No. 4,516,046 dated May 7, 1985. The Boesel patent further discloses modifications to interpoles for improving sparkless commutating with less influence on the main poles by shaping interpole tips and by including auxiliary windings. The Mercier patent discloses an arrangement whereby high-strength rare earth magnets are used as main poles with auxiliary wound poles to create a flux added to or subtracted from the main flux depending on motor velocity.

However, these known interpoles are limited in applicability to dynamoelectric machines which are sufficiently large to accommodate interpole windings. Typically, interpoles are only used in larger higher horsepower D.C. motors, where high torque output is required without concern for space conservation.

When dealing with the newest high-strength permanent magnet material, it is a main concern to use as little material as possible while maintaining a high flux field to generate sufficient torque. Moreover, these high-strength permanent magnets allow the manufacture of much smaller motors which are applicable, for example, to automotive equipment operating within very small confined spaces. The attempt to then improve the efficiency of the motors by including wound interpoles would absolutely defeat the above-stated purpose, because the windings would require more space and would increase motor size. Such an attempt is shown by the Mercier patent.

Moreover, as stronger magnets are used for the main poles, and the dynamoelectric machine diameters are therefor reduced, the distance between the armature surface and the inside diameter of the field frame becomes so short that many lines of armature flux can travel across the distance in the commutating zone. The increase in flux in the commutating zone will offset the efficiency obtained by the thinner higher strength magnets.

Clearly then, a D.C. dynamoelectric machine that utilizes high-strength magnets as the main poles for space conservation and that has improved efficiency due to the effective countering of armature reaction is needed.

SUMMARY OF THE INVENTION

It is a primary object of the present invention to provide a D.C. dynamoelectric machine which overcomes the disadvantages associated with the prior art.

It is a further object of the present invention to provide a D.C. dynamoelectric machine which uses high-strength permanent magnets for the main poles, wherein the high-strength permanent magnets are sufficient to provide a strong field from the main poles for torque or current production, and which will sufficiently resist demagnetization force from armature reaction at the edges of the permanent magnets, while minimizing the amount of high-strength permanent magnet material used.

It is yet a further object of the present invention to produce a D.C. dynamoelectric machine utilizing thin high-strength permanent magnets for the main poles, wherein the edge of the permanent magnet pole that is subject to demagnetization due to armature reaction is flared from the arcuate face region of the main pole face, so as to increase the air gap between an armature and the main pole edge subject to demagnetization.

It is yet a further object of the present invention to provide a direct current dynamoelectric machine comprising a field frame having at least two main poles establishing a magnetic field within the field frame and an armature rotatably disposed within the field frame, defining an air gap between the armature and the main poles of the field frame, wherein each of the main poles is comprised of a high-strength permanent magnet of substantially constant thickness throughout, including a main portion shaped generally as a concentric arc, and a means for increasing the air gap between the armature and the main poles at an edge portion of the permanent magnets to resist demagnetization force. The edge portion of the permanent magnet provided with the means for increasing the air gap is the edge of the main pole which tends to be demagnetized by flux generated by the armature when the armature windings are loaded.

It is a still further object to provide a permanent magnet for the dynamoelectric machine of the present invention, wherein the permanent magnet has a pole face including an arc portion, which is concentric to the outer circumferential surface of the armature of the machine, and a flared portion shaped to extend away from the armature of the machine, wherein the flared portion and the arc portion of the pole face are joined along a line of intersection and the flared portion is tangent to the arc portion at the line of intersection.

It is yet a further object to provide the permanent magnet main pole of the present invention on a direct current motor or on a direct current generating machine. In the case of a D.C. motor, the tangent flared portion is provided on the trailing edge. On a D.C. generator, the opposite is true.

It is also an object of the present invention to provide a dynamoelectric machine having interpole means for improving the commutation characteristics of the machine provided within the commutating zone, wherein the interpole means comprises a permanent magnet. Preferably, the permanent magnet is non-magnetically connected to the field frame to increase its effectiveness against armature reaction over the useful load range of the machine.

It is also an object of the present invention to provide a direct current dynamoelectric machine that utilizes high-strength magnets as the main poles that has an improved efficiency due to effective countering of armature reaction by interpole means. In the present invention, the armature reaction is effectively countered by permanent magnet interpoles that are disembodied from the field frame. In other words, each of the permanent magnets is separated from the field frame by a non-magnetic means. Advantageously, such a permanent magnet interpole is maintained sufficiently close to the armature surface to clearly define the pattern of its effect on the armature. Moreover, it has also been unexpectedly found that the interpole is beneficial throughout the useful load range of a dynamoelectric machine. The result is that the dynamoelectric machine of the present invention can operate over a range of useful loads while still effectively giving sparkless commutation.

The above objects and advantages applied to a direct current dynamoelectric machine are achieved by the provision of main poles utilizing high-strength permanent magnets which are thick enough to supply a magnetic field, but having a flared portion at an edge thereof (such as at the trailing edge on a D.C. motor) for increasing the air gap towards that edge to resist demagnetization resulting from armature reaction. Particularly, the permanent magnets of the main poles include a concentric portion of constant thickness and the flared portion of the same constant thickness, wherein the flared portion joins the concentric arc portion in a tangential manner. The dynamoelectric machine also includes permanent magnet interpoles between the main poles, wherein each permanent magnet for each interpole is supported nearby the armature surface by a means that is magnetically non-conductive so that flux from the permanent magnet interpole is limited by an effectively large air gap to a value appropriate for the strength of an interpole.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
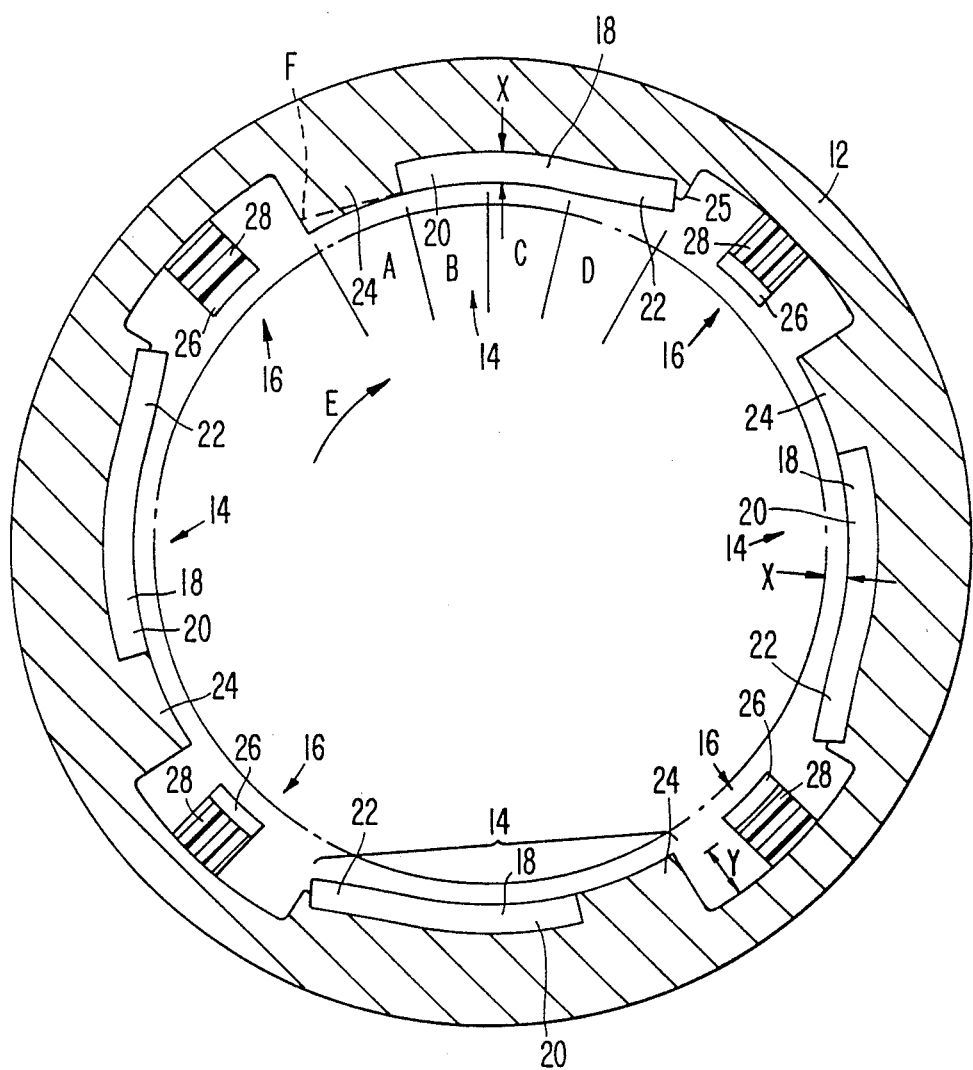
FIG. 1 is a cross-sectional view of a field frame assembly with one design of main poles and interpoles formed in accordance with one aspect of the present invention.

Referring to the several figures, and in particular to FIG. 1, a direct current dynamoelectric machine 10 is illustrated. For the sake of clarity, the preferred embodiment of the dynamoelectric machine 10 will be described as a direct current motor, with the understanding that the same principles are applicable to direct current generators as well.

In FIG. 1, a D.C. motor is shown including a field frame 12 made of magnetically permeable material to allow the magnetic field flux circuits of the motor to flow within the field frame 12. It is understood that the field frame 12 can be made as a single piece of magnetic material or from a stack of laminations of magnetic material. A suitable magnetic material is iron, which can typically be made from pressed and sintered powdered iron. Normally in a D.C. motor, the field frame is made from a single magnetic piece. The field frame 12 is provided with main poles 14, of which four are shown in FIG. 1, to set up a magnetic field within the field frame 12. The main poles 14 are located in series along the inside diameter of the field frame 12 with 90° spaced intervals between the centers of the main poles 14. Equally between each of the main poles 14, an interpole 16 is provided, wherein the interpoles are likewise spaced at 90° intervals. The interpoles 16 are located within the field frame at the area known as the commutating zone, for the purpose of counteracting magnetic flux within the commutating zone which is resultant from armature reaction. The well known concept of armature reaction and the use of interpoles in general within the commutating zone is further emphasized in the background section, supra.

In order to set up the main field within the field frame 12, the main poles 14 include permanent magnets 18 at the innermost faces of the main poles 14. These permanent magnets 18 are comprised of high-strength permanent magnet material, which is now known in the art for its superior magnetic energy. A representative magnetic material which is suitable for the present invention is a neodymium-iron magnetic material, such as that which can be obtained under the trademark MAG-NEQUENCH from the Delco Remy Division of General Motors Corporation, Detroit, Michigan. Such permanent magnets are beneficial in that a very thin layer of magnetic material can be used as the permanent magnets 18, while having a sufficient magnetic energy to provide a magnetic field sufficient for the torque output of the D.C. motor. However, permanent magnets of such magnetic material are both difficult and expensive to manufacture. Furthermore, there is a nominal low limit to the thickness of these magnets set by the brittleness of the hard sintered material, which requires delicacy in handling. In conventional motor designs, the magnets cannot even be made down to this limit, however, because the trailing end would demagnetize on stall. It is noted that every motor is on stall at start up. Thus, the present invention advantageously minimizes the amount of magnetic material for the permanent magnets 18, but also insures that a sufficient magnetic field is produced.

In order to provide a main pole which efficiently and effectively makes use of such a high-strength permanent magnetic material, the main pole 14 is geometrically divided, for the purpose of discussion of the basic principles of the present invention, along its pole face into four equal radial segments A, B, C, and D, each of which in this representative embodiment is equal to 15° of angular rotation. The exact extent of each segment can be determined by calculations of the representative field forms, referred to below, for a particular manufactured design, of which only one design is illustrated. The permanent magnet 18 itself takes up segments B, C, and D, while the first segment A is provided by a radial extension of the field frame 12 designated as the leading edge 24. Alternatively, the permanent magnet 18 could also extend entirely or partially through segment A as well. A ridge 25 is also provided at the edge of each main pole 14 to help secure each magnet 18 in place. The permanent magnet 18 is held in place by any suitable layer or line of adhesive between the permanent magnet 18 and the field frame 12. Any other suitable means is also contemplated.

The permanent magnet 18 is divided into two portions, 20 and 22, wherein the first portion 20 extends as a concentric arc to the field frame 12 and an outer surface of an armature within the motor structure along segments B and C. The other portion of permanent magnet 18 is a flared portion 22 of the permanent magnet 18 which extends away from the surface of an armature, the armature surface being illustrated in FIG. 1 by the broken circle within the field frame 12. This flared portion 22 has a substantially flat pole face, wherein the plane of the pole face of the flared portion 22 is tangent to the circle defining the concentric arc portion 20 at the interface between segments C and D. In other words, the flared portion 22 extends from the concentric arc portion 20 at the interface between segments C and D tangentially to the concentric arc at the point of the interface. Thus, a line of intersection is defined at the interface of segments C and D, which, in the preferred embodiments, is at a line 15° (in a 4-pole machine) from the center of each main pole in the direction of rotation of the armature designated by arrow E in FIG. 1 for a D.C. motor.

In each particular physical design of motors, the degree and start of the flare may be modified or blended, as long as there is still a resistance to demagnetization. Such a resistance can be found by proper calculations.

Taking into account the direction of rotation E of the armature in a D.C. motor, the portion of the field frame 24 is hereinafter referred to as the leading edge and the flared portion of the permanent magnet 22 will hereinafter be referred to as the trailing edge.

This main pole design takes full advantage of the strength of the permanent magnetic material, as well as effectively preventing demagnetization of the permanent magnetic material at the trailing edge 22 by armature reaction while taking advantage of armature reaction at the leading edge 24. It is well understood in D.C. motors that armature reaction flux generated by the armature as current is applied to the armature windings will tend to demagnetize the trailing edge of a main pole while increasing the magnetic strength of the leading edge. It is also well known that the amount of armature reaction is proportional to the amount of current supplied to the armature windings.

By forming the leading edge 24 of the main pole 14 as a part of the field frame 12, the increase in magnetic flux along the leading edge from armature reaction is effectively used to supplement the main pole 14 without the need to extend the permanent magnet 18 to the leading edge. Thus, a ¾ span permanent magnet takes advantage of armature reaction at the leading edge. A further advantage of the ¾ span permanent magnet is emphasized when operating at low armature loads. The flux at the leading edge 24 depends on armature reaction, which is likewise proportional to load, so that a low load results in a flux reduction at the leading edge 24. This flux reduction at the leading edge can be beneficially utilized in a cranking motor, because it causes a higher free speed with a tendency toward higher speeds at lower loads. Thus, a cranking motor can crank faster with low loads without a braking effect, which is a problem associated with gear reduction starters. It has been found that at a 50 amp load, a flux reduction of approximately 15 percent is obtained. Furthermore, the leading edge 24 does not come up to the strength of a full span magnet until about a 200 amp load is applied, which will become more clear below with reference to FIG. 6.

To effectively resist the demagnetization force from armature reaction on the trailing edge 22, the permanent magnet 18 at portion 22 along with the air gap X between the armature surface and the main pole must "use up" the demagnetization force. Therefore, by flaring the portion 22 away from the armature surface, the air gap is increased to add to the ability total to resist demagnetization.

Moreover, the flared portion 22 enables the permanent magnet 18 to be made of a constant thickness, wherein the concentric arc portion 20 is made to the thickness necessary for field strength and the flared portion 22, kept at the same constant thickness, controls demagnetization. There is thus no need to thicken the entire magnet to resist the demagnetization. If the same constant thickness (the thickness only necessary for the field) were maintained all the way to the trailing edge without increasing the air gap by flared portion 22, i.e., the entire magnetic 18 formed as a concentric arc to the trailing edge, the thickness necessary to provide the field strength would not be sufficient to resist demagnetization due to armature reaction. Thus, the magnetic pole of the present invention advantageously utilizes a permanent magnet 18 which can be of a thickness just sufficient to provide the magnet field, which will also sufficiently resist demagnetization. This is because of the increased air gap and magnet thickness total resultant from flaring the trailing edge 22 away from the armature and into the normal concentric circle of the field frame. Moreover, the amount of magnetic material necessary to make up permanent magnet 18 is minimized, and the cost thereof is likewise reduced. This is, of course, of extreme importance when dealing with extremely costly high strength magnetic material, where efficiency must be weighed against costs. Likewise, the advantageous shape of the main pole enables a minimum thickness of pole material in series with the wider air gap to withstand armature reaction created by load current without surrendering to the demagnetizing force at the trailing edge of the main pole 14. The minimum thickness of the magnets further facilitates smaller motors of higher torque.

Figure 9:
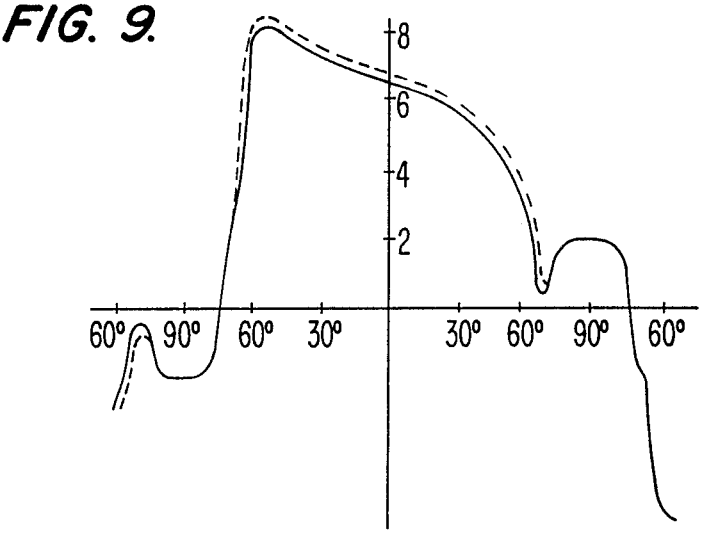
FIG. 9 is a graphic illustration comparing field forms of different thickness permanent magnets in a dynamoelectric machine, according to the present invention.

A permanent magnet main pole with a full concentric arc would have to be 50 percent thicker in order to resist demagnetization, and would only provide a slight quantity m ore of total field flux from the extra magnetic material. To emphasize this situation, FIG. 9 plots the field form of the total field flux over a main pole and interpole generated by a permanent magnet main pole with the solid line representing the permanent magnet 18 having a concentric arc portion 20 and a flared portion 22 and the dotted line represents a full concentric permanent magnet that is 50 per cent thicker. It is clearly seen that the additional magnetic material only slightly increases the total field flux, by less than 5 percent, while increasing the cost associated with the permanent magnetic material by 50 percent.

Referring again to FIG. 1, the interpoles 16 are described in detail below. Each interpole 16 is comprised of a permanent magnet 26, which is preferably formed of high-strength permanent magnetic material, similar to or the same as that used as the permanent magnets 18 for the main poles 14. The permanent magnets 26 are maintained close to the surface of the armature, preferably at the same air gap X as that of the main poles, to insure that the permanent magnets are able to establish their effective flux pattern on the armature for countering the effects of armature reaction within the commutating zone between main poles 14. If the permanent magnets are not maintained close enough to the armature, then the permanent magnets tend to lose their focus on an exact area, and sparking and losses will not be so well controlled. Each of the permanent magnets 26 is supported by a means comprising a non-magnetic support block 28. Moreover, to keep away from eddy-current losses, the support block 28 is also non-conductive electrically.

By making the support block 28 from non-magnetic material, the permanent magnet 26 is basically disembodied from the field frame 12. This disembodied feature advantageously insures that the permanent magnet 26 is maintained nearby the armature surface, while still providing the necessary air gap to prevent demagnetization of the interpole 16 and to control the strength of the interpole permanent magnet 26. As will become more apparent and as described below with reference to the field forms in FIGS. 6, 7 and 8, the net flux under the interpole must be at a much lower level than in the main field. Moreover, the interpole material must have much the same magnetic strength as that of the main poles to avoid demagnetization, but must be toned down in strength by the air gap to have the proper effect. In summary, the flux from permanent magnet 26 is limited beneficially in its flow across the support 28 to the field frame 12. Basically, there is then defined an air gap Y between the field frame and the permanent magnets 26, wherein the gap is kept relatively large compared to the thickness of the permanent magnet 26 to restrain the effect of the permanent magnet 26 on the field frame 12. Accordingly, with high-strength permanent material, the permanent magnets 26 are also kept very thin (perhaps thinner than even permanent magnets 18 of the main poles 14).

The disembodied feature of the permanent magnet interpoles of the present invention has a derivative benefit in that each interpole 16 has been found to be beneficial throughout the useful load range of the motor as current is applied to the armature. In a prior art type wound interpole, the interpoles are normally wound in series with the armature windings so that the current to the interpoles is proportionally increased with the current supplied to the armature windings. By this arrangement, the interpoles are self-regulating with respect to the armature windings and are effective over the entire load range. However, the permanent magnet interpole 16 of the present invention has been found to be effective over the range of useful loads applied to the armature without any additional control of the interpoles. There is no need to move or otherwise change the interpoles 16 as the load is varied within the useful load range of such a motor.

Figure 10:
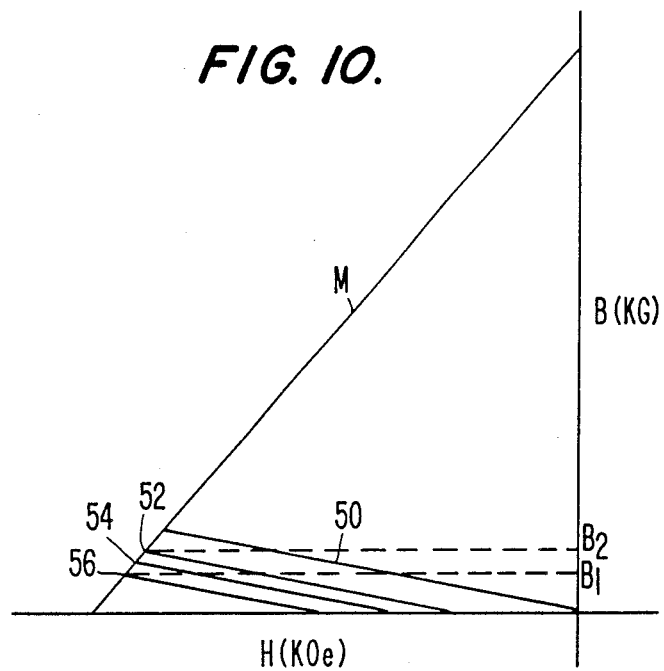
FIG. 10 is a graphic illustration of the characteristic magnetic properties of a high strength magnetic material suitable for use in the interpoles of the present invention comparing magnetization, in kilogauss, to coercivity, in kilooersteds.

The above noted advantage is emphasized in FIG. 10, wherein the inherent characteristic curve M of the preferred magnetic material used for the interpoles is shown with the magnetization B in kilogauss on the ordinate and coercivity H in kilooersteds on the abscissa. The line M, for example a 24° C. normal demagnetization curve, represents the residual magnetism and the flux available to operate the motor. The line 50 is a slope line plotted for an embodiment having a 0.06 unit magnet with a 0.28 unit air gap, wherein the slope equals B/H or approximately the length of the air gap divided by the thickness of the magnet. Lines 52, 54 and 56 correspond to the demagnetization force associated with a 200 amp, 300 amp and 400 amp load applied to the armature windings respectively. The distance along line M between lines 50 and 56 defines the variation of the interpole flux density throughout the load range for a motor of the present invention. As can be seen, the flux density does not change much with armature current between $B_1$ and $B_2$, which represent the flux density at 400 and 200 amps respectively. Specifically, with a 0.06 magnet at a 0.28 gap utilizing a neodymium-iron magnet such as the above noted "Magnequench", the flux density $B_1$ was found to be 0.45KG at 400 amps and $B_2$ was found to be 0.70KG at 200 amps, leaving a difference in flux density of only 0.25KG over the entire useful load range.

Figure 6:
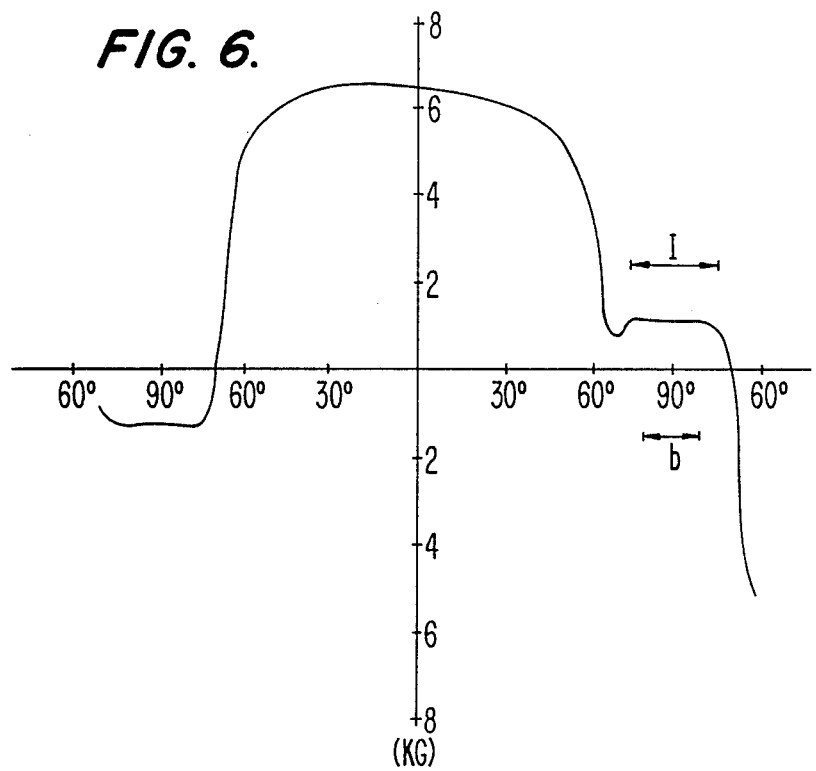
FIG. 6 is a graphic illustration of a magnetic flux field form over 240° electrical of a dynamoelectric machine in accordance with the present invention, with the armature windings subject to a 200 amp load.
Figure 7:
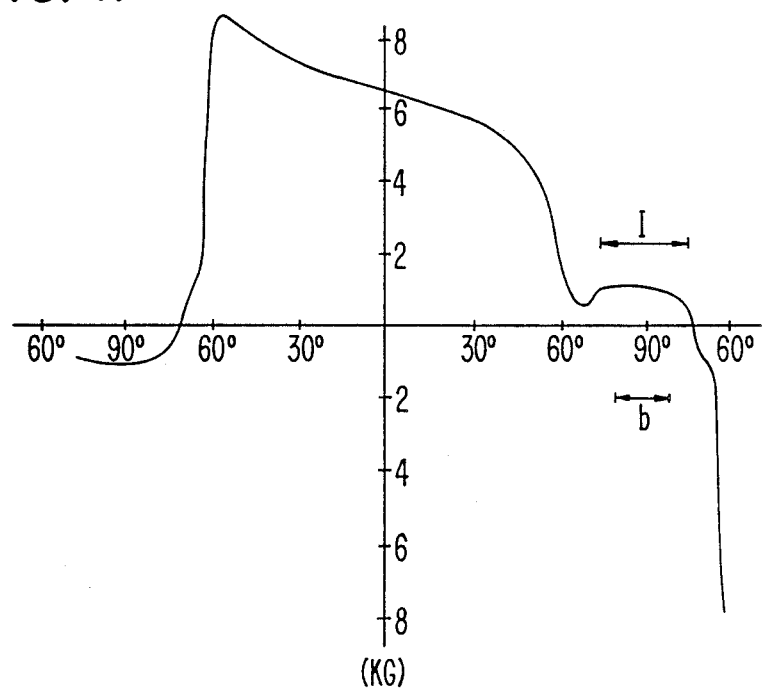
FIG. 7 is a graphic illustration of a magnetic flux field form over 240° electrical of a dynamoelectric machine with the armature windings subject to a 300 amp load.
Figure 8:
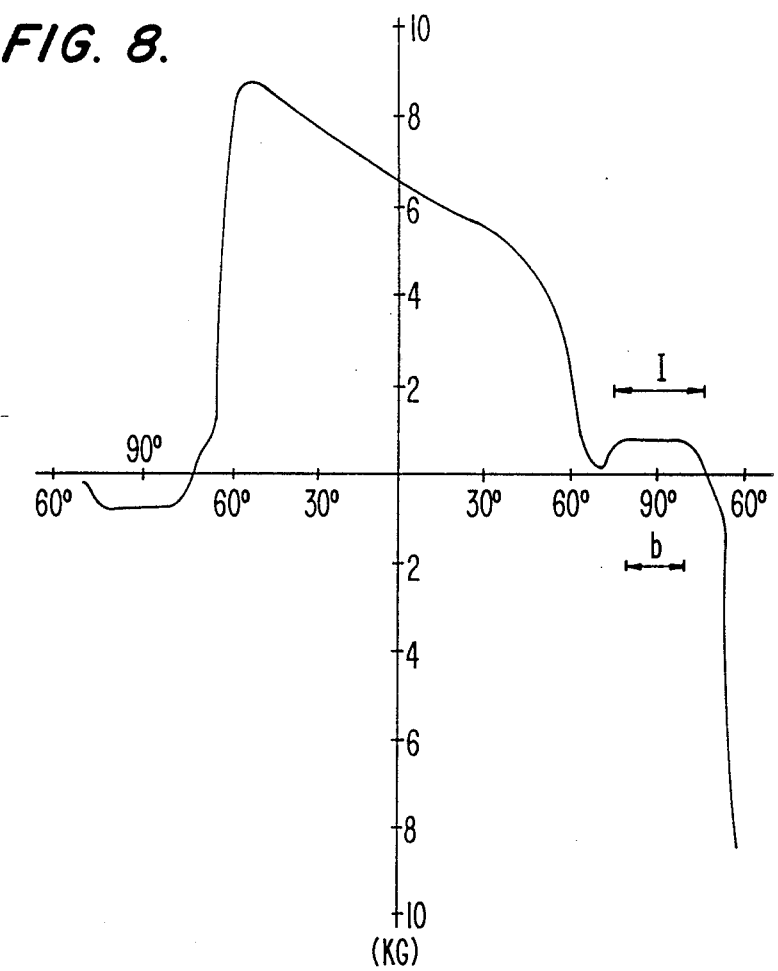
FIG. 8 is a graphic illustration of a magnetic flux field form over 240° electrical of a dynamoelectric machine according to the present invention with the armature windings subject to a 400 amp load.

The field forms plotting the total field flux of a D.C. motor in accordance with the present invention are illustrated in FIGS. 6, 7 and 8. FIG. 6 corresponds to the flux patterns over 240° electrical of the main pole and interpole when the armature windings are subject to a 200 amp load. The main pole is represented over the 120° electrical, extending 60° to either side of the ordinate, and the interpole width is represented by I. The total flux between the main pole and the interpole is maintained above the line. The interpole keeps the flux from plunging to opposite polarity (below the line) abruptly at the start of commutation and it holds the voltage between armature coil ends in the commutating zone to a low value by competing with the inductance voltage of the armature coil until the coil connection passes the trailing edge of the brush. The brush width is designated as the letter b. The position of the total flux field form with respect to the abscissa is dependent on the width of the interpole and the thickness of the magnetic material, which in the illustrated embodiment is 0.38 in. wide and 0.10 in. thick. The part of the field form in FIG. 6 representative of the flux at the leading edge is shown above the 60° mark in the fourth quadrant by a generally rounded curve. This is due to the use of a main pole designed in accordance with the FIG. 1 embodiment, wherein the main pole includes a leading edge 24 formed as a part of the field frame 12. Therefore, it can be seen that the armature reaction from a 200 amp load does not greatly affect the leading edge of the main pole as it does when greater loads are applied, as seen in FIGS. 7 and 8.

In FIG. 7, represented is a field form similar to that of FIG. 6 in that the main pole is represented between the 60° marks and the interpole width is noted at I. Likewise, the interpole width and thickness (same as in FIG. 6) keeps the total flux between the main pole and the interpole above the line to keep the total flux from plunging to opposite polarity abruptly at the start of commutation. In this field form, however, the armature reaction resulting from the 300 amp applied load to the armature windings results in a much greater effect on the leading edge of the main pole. As seen above the 60° mark in the fourth quadrant, a peak in the field form is made representative of a greatly increased flux at the leading edge due to armature reaction. Such a substantial difference occurs as compared to the FIG. 6 field form because the flux in this section is substantially in proportion to the armature ampere turns. Armature reaction and the air gap length are the basic determinants of the flux until some iron saturation is reached. In fact, the leading edge comprising the extension 24 of the field frame 12, may also be flared, much the same as the trailing edge, to keep from over-saturating the armature teeth at the edge of the main poles and creating undesirable iron loss. A flared pole face on the leading edge of the extension portion 24 of the field frame is represented by dotted line F in FIG. 1.

The field form of FIG. 8 illustrates a 400 amp load applied to the armature windings, wherein the main pole is also represented between the 60° marks nearest the ordinate and the interpole is noted at I. Once again, the interpole maintains the total flux above the line, and keeps the total flux from plunging to opposite polarity abruptly at the start of commutation. In this field form, it can also be seen that the leading edge is significantly higher than that of FIGS. 6 and 7 due to increased effect on the leading edge by armature reaction.

Moreover, it is also illustrated in each of the FIGS. 6, 7 and 8, that the brush width b is kept within the interpole width, so that sparking at the brush and commutator is effectively reduced or eliminated over the entire useful load range as a result of the permanent magnet interpoles of the present invention. Also, the total flux in the interpole area of each of the field frames representing 200 amp, 300 amp, and 400 amp loads is not widely different in each case. The flux is similar even though a non-variable permanent magnet is used as the interpole. Once again, such an advantageous result extends from the disembodied relationship of the interpole permanent magnet from the field frame.

Such thin high-strength permanent magnet interpoles are entirely consistent with the permanent magnet main poles of the present invention. Thus, motor diameter can be greatly reduced, while the efficiency is increased. Clearly, a superior motor can be obtained with higher torque and/or speed output and with a smaller size.

Figure 2:
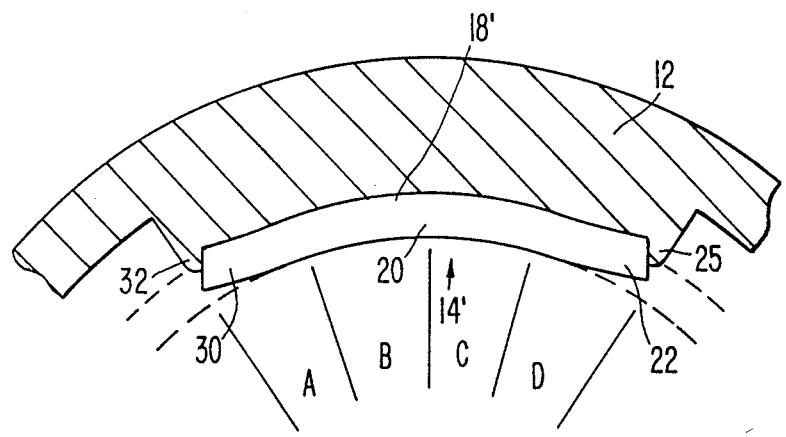
FIG. 2 is a partial cross-sectional view illustrating a different main pole and field frame design also in accordance with the present invention.

In FIG. 2, a more basic version of the main pole is shown at 14'. This main pole 14' is likewise divided into segments A, B, C and D for the purpose of description. However, this main pole includes a permanent magnet 18' with a concentric arc portion 20, a flared trailing edge portion 22 and a flared leading edge portion 30. A ridge 32 is also provided with ridge 25 to secure the magnet in place. Typically, an adhesive is also used between the magnet 18' and the field frame 12. This permanent magnet design not only effectively resists demagnetization at the flared trailing edge 22, but does not discount the flux at the leading edge because it is supported by armature reaction. The additional magnetizing force at the leading edge portion 30 is added to the magnetizing force generated by the permanent magnet at 30 to extend across the larger air gap due to the flare so as not to overly affect the flux total in this sector. Thus, constant magnet thickness is maintained without significant loss of flux and torque.

Figure 11:
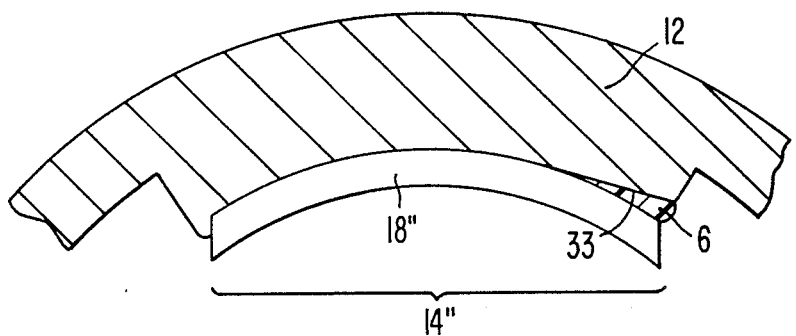
FIG. 11 is a partial cross-sectional view illustrating another main pole design with an increasing air gap in accordance with the present invention.

Furthermore, the present invention revolves around the basic incorporation of an increasing total of permanent magnet thickness and air gap between the armature and the field frame main poles at the edge to be subject to demagnetization force when loaded. As above stated, it is important that the air gap at that edge and the permanent magnet thickness must use up the negative force of armature reaction. Thus, it is also contemplated, and as shown in FIG. 11, that an increasing air gap could be provided radially behind the permanent magnet 18" of the main pole 14" by using a fully concentric permanent magnet 18" with an increasing air gap behind it, that is formed by a flared support surface 33 of the main pole field frame. However, the edge of the magnet would then be in a precarious position physically. In such case, it is possible to then support that edge by a non-magnetic material G to define an effective air gap. One such material contemplated is silicone rubber. Thus, such a main pole also exemplifies that the resistance to demagnetization is in direct proportion to magnet thickness plus total air gap in series. In this case there are two air gaps.

Figure 3:
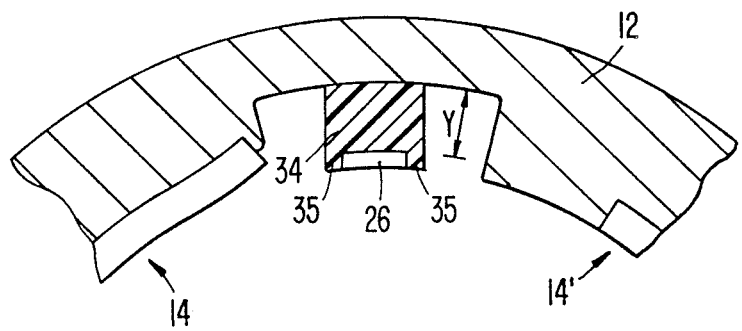
FIG. 3 is a partial cross-sectional view illustrating an elaborated mounting of the interpole of the present invention on the field frame.

In FIG. 3, a modified interpole is illustrated with an option to increase security for the permanent magnet 26. In this case, the support means comprises a non-magnetic block 34 provided with a peripheral ridge 35 to encase the permanent magnet 26 from all sides except the face side thereof. Similar to the FIG. 1 embodiment, the air gap Y in series with the main pole is also maintained.

Figure 4:
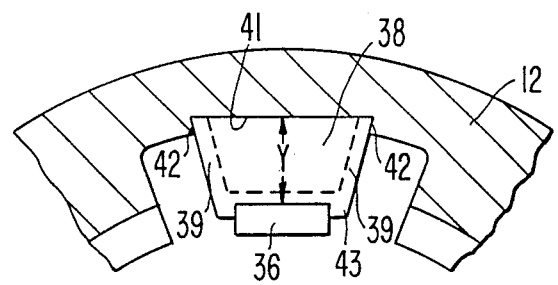
FIG. 4 is a partial cross-sectional view illustrating another modified interpole and a clip-type supporting structure in accordance with the present invention.
Figure 5:
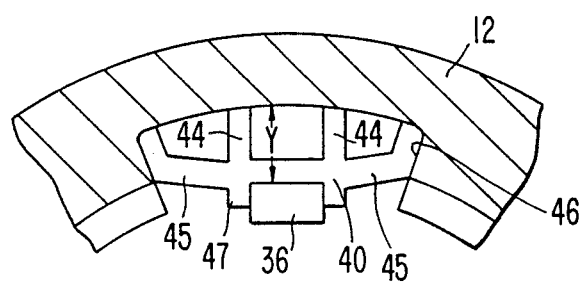
FIG. 5 is a partial cross-sectional view illustrating yet another modified interpole with another clip-type supporting structure.

Other modified embodiments of an interpole structure including a permanent magnet are shown in FIGS. 4 and 5. In each of the further embodiments, the interpole permanent magnets 36 are held within non-magnetic clip-type supports 38 and 40, respectively.

In FIG. 4, the support 38 includes leg portions 39 which are resiliently retained within a recess 41 provided within the field frame 12. The recess 41 includes angled edges 42 which together with the outwardly biased resilient legs 39 retain the support 38 to the field frame. The interpole permanent magnet is similarly adhered to the clip-type support 38, with a peripheral ridge 43 to increase security. As above, the legs 39 ensure the necessary effective air gap Y between the permanent magnet 36 and the field frame 12 for the disembodied interpole feature of the present invention.

In FIG. 5, the clip-type support 40 similarly includes leg portions 44 to provide the effective disembodied air gap Y of the ,permanent magnet 36. Moreover, outwardly biased resilient legs 45 positively engage sides 46 of the main poles adjacent thereto to secure the interpole in place. Once again, the permanent magnet 36 is adhered in place with a surrounding peripheral ridge 47. Note that legs 44 could additionally be provided within recesses in the field frame, similar to legs 39 in FIG. 4.

The above-described dissertation has been predicated on the use of high-strength magnets such as neodymium-iron and samarium-cobalt. However, it is understood that a motor using ferrite magnets could be designed along these same principles, but the benefits gained would not be as great.

While it is evident that various embodiments in accordance with the present invention have been shown and described above, it is understood that the same is not limited thereto, but is susceptible of numerous changes and modifications as known to those skilled in the art and, therefore, it is not intended that the present invention be limited to the details shown and described herein, and the invention is intended to cover all such changes and modifications as are encompassed by the scope of the appended claims.

INDUSTRIAL APPLICABILITY

A main pole and/or interpole designed in accordance with the present invention would be applicable to all types of direct current dynamoelectric machines utilizing a commutator. Such applications includes D. D. motors, ranging from very small horsepower to those of large horsepower used in industrial applications, as well as to direct current generators of all sized. It is apparent that as newer and stronger magnetic material is discovered, the magnetic material may be applied with the same design criteria of the present invention for both the main poles and interpoles to effectively reduce motor or generator size proportionally. It is further understood that permanent magnet interpoles have applicability to direct current dynamoelectric machines that utilize windings as field coils, wherein the permanent magnet interpoles could just as easily be fitted between the wound main poles in a disembodies manner to effectively counter armature reaction over a load range of the dynamo.

The interpoles may also be usefully incorporated in dynamos wherein the commutation is accomplished by electronic means rather than mechanical means. The improvement in efficiency will be of the same order as already noted. The help in commutation provided by the interpoles will lower the voltage stress on electronic components, thus increasing life or allowing use of less expensive components.

I claim:

1. A high-strength permanent magnet for use in a direct current dynamoelectric machine having a field frame and an armature rotatably disposed therein with an air gap defined between an outer surface of the armature and main pole faces of the field frame, said permanent magnet to be secured to the field frame to produce a magnetic field in the field frame and to define at least a part of a main pole face, said permanent magnet comprising:

a concentric arc portion and a flared portion which together define a pole face having an arcuate face and a substantially flat face, said flared portion for increasing the air gap toward an edge of said permanent magnet to be subject to a demagnetization force and thus the sum of the magnet thickness and air gap to resist said demagnetization force, wherein there is a line of intersection on said pole face where said arcuate face and said substantially flat surface meet, said substantially flat face extends from said arcuate face entirely to said edge of said permanent magnet to be subject to demagnetization force, and said substantially flat face is tangent to said arcuate face at said line of intersection on said pole face.

2. The permanent magnet of claim 1, wherein said permanent magnet is of substantially uniform thickness throughout said concentric arc portion and said flared portion.

3. The permanent magnet of claim 2, in combination with a direct current dynamoelectric machine, wherein said permanent magnet is secured to a main pole of a field frame to provide a field flux within said field frame, and an armature means is rotatably disposed within said field frame to define an air gap between an outer surface of said armature means and said pole face of said permanent magnet, said air gap being substantially constant over said concentric arc portion and increasingly large over said flared portion, whereby said flared portion is provided at a trailing edge of said main pole to effectively resist a demagnetization force caused by armature reaction when said dynamoelectric machine is a motor.

4. The permanent magnet of claim 1, wherein said concentric arc portion extends over approximately a 30° arc and said flared portion extends about 15° beyond said 30° arc.

5. The permanent magnet of claim 4, wherein said permanent magnet is composed of a neodymium-iron magnetic material.

6. The permanent magnet of claim 1, further including a second flared portion adjacent said concentric arc portion thus defining a pole face with a substantially flat face on each opposite side of said arcuate face, wherein each substantially flat face is tangent to said arcuate face at the line of intersection on said pole face where each substantially flat face meets said arcuate face.

7. The permanent magnet of claim 6, wherein said concentric arc portion extends over approximately a 30° arc, and each flared portion extends about 15° beyond said 30° arc.

8. The permanent magnet of claim 7, wherein said permanent magnet is substantially uniform in thickness throughout said concentric arc portion and each flared portion.

9. A high-strength permanent magnet for use in a direct current dynamoelectric machine having a field frame and an armature rotatably disposed therein with an air gap defined between an outer surface of the armature and main pole faces of the field frame, said permanent magnet to be secured to the field frame to produce a magnetic field in the field frame and to define at least a part of a main pole face, said permanent magnet comprising:
a concentric arc portion and a flared portion which together define a pole face having an arcuate face and a substantially flat face, said flared portion for increasing the air gap toward an edge of said permanent magnet to be subject to a demagnetization force and thus the sum of the magnet thickness and air gap to resist said demagnetization force, wherein there is a line of intersection on said pole face where said arcuate face and said substantially flat surface meet, said substantially flat face extends from said arcuate face entirely to said edge of said permanent magnet to be subject to demagnetization force, and said permanent magnet is of substantially uniform thickness throughout said concentric arc portion and said flared portion.

10. The permanent magnet of claim 9, wherein said concentric arc portion extends over approximately a 30° arc and said flared portion extends about 15° beyond said 30° arc.

11. The permanent magnet of claim 10, wherein said permanent magnet is composed of a neodymium-iron magnetic material.

12. The permanent magnet of claim 9, further including a second flared portion adjacent said concentric arc portion thus defining a pole face with a substantially flat face on each opposite side of said arcuate face, wherein each substantially flat face is tangent to said arcuate face at the line of intersection on said pole face where each substantially flat face meets said arcuate face.

13. The permanent magnet of claim 12, wherein said concentric arc portion extends over approximately a 30° arc, and each flared portion extends about 15° beyond said 30° arc.

14. The permanent magnet of claim 13, wherein said permanent magnet is substantially uniform in thickness throughout said concentric arc portion and each flared portion.

15. The permanent magnet of claim 7, in combination with a direct current dynamoelectric machine, wherein said permanent magnet is secured to a main pole of a field frame to provide a field flux within said field frame, and an armature means is rotatably disposed within said field frame to define an air gap between an outer surface of said armature means and said pole face of said permanent magnet, said air gap being substantially constant over said concentric arc portion and increasingly large over said flared portion, whereby said flared portion is provided at a trailing edge of said main pole when said dynamoelectric machine is a motor to effectively resist a demagnetization force caused by armature reaction.

16. A direct current dynamoelectric machine comprising:
a field frame of magnetic flux conductive material having means for establishing a magnetic field within said field frame provided on at least two main poles; and
an armature rotatably disposed within said field frame having an armature winding thereon, said armature defining an air gap between an outer surface thereof and a pole face of each of said main poles,
wherein said means for establishing a magnetic field includes a plurality of high-strength permanent magnets with one permanent magnet for each of said main poles, each permanent magnet being of substantially uniform thickness throughout including a concentric arc portion that is substantially concentric along its face with said armature outer surface and a means for increasing the air gap between the armature and the main poles at an edge portion of each of the permanent magnets subject to a demagnetization force when said machine is loaded for resisting said demagnetization force, and further wherein each permanent magnet includes a flared portion at said edge portion as said means to increase the air gap.

17. The dynamoelectric machine of claim 16, wherein said concentric arc portion and said flared portion of each permanent magnet together define a pole face having an arcuate face about the center of rotation of said armature, and a substantially flat face, further wherein there is a line of intersection on said pole face where said arcuate face and said substantially flat face meet and said substantially flat face extends from said arcuate face entirely throughout said edge portion.

18. The dynamoelectric machine of claim 17, wherein said concentric arc portion extends over approximately a 30° arc, and said flared portion extends about 15° beyond said 30° arc.

19. The dynamoelectric machine of claim 18, wherein said permanent magnet is composed of a neodymium-iron magnetic material.

20. The dynamoelectric machine of claim 17, further including a second flared portion adjacent said concentric arc portion thus defining a pole face with a substantially flat face on each opposite side of said arcuate face, wherein each substantially flat face is tangent to said arcuate face at the line of intersection on said pole face where each substantially flat face meets said arcuate face.

21. The dynamoelectric machine of claim 20, wherein said concentric arc portion extends over approximately a 30° arc, and each flared portion extends about 15° beyond said 30° arc.

22. The dynamoelectric machine of claim 16, further including interpole means connected to said field frame in a commutating zone between said main poles for countering armature reaction and improving commutation characteristics of said dynamoelectric machine, wherein said interpole means includes an interpole permanent magnet.

23. The dynamoelectric machine of claim 22, wherein said interpole means also includes a non-magnetic support means between said field frame and said permanent magnet to keep said interpole permanent magnet nearby said armature outer surface so as to allow a maximum effect of the interpole permanent magnet on said armature, while inhibiting flux travel from said interpole permanent magnet to said field frame, w hereby said non-magnetic support means effectively defines an air gap between the interpole permanent magnet and the field frame in series with the air gap between the armature outer surface and the main poles.

24. The dynamoelectric machine of claim 16, wherein said dynamoelectric machine is a direct current motor, and the flared portion of each permanent magnet is provided at a trailing edge of each main pole to resist demagnetization caused by armature reaction.

25. The dynamoelectric machine of claim 20, further including a field frame extension as a leading edge of each main pole to direct flux resultant from armature reaction into said magnetic field within said field frame.

26. The dynamoelectric machine of claim 25, wherein said field frame extension is also flared away from said armature to increase the air gap toward the leading edge.

27. The dynamoelectric machine of claim 16, wherein said means for increasing the air gap comprises a flared support surface formed on each main pole behind each permanent magnet to increase the air gap at said edge portion.

28. A direct current dynamoelectric machine comprising:
- a field frame of magnetic flux conductive material including means for establishing a magnetic field within said field frame, said means including at least two main poles;
- an armature means rotatably disposed within said field frame including an outer surface, which defines an air gap with faces of said main poles; and
- interpole means for improving commutation characteristics of said dynamoelectric machine connected to said field frame in at least one commutating zone between said main poles, said interpole means comprising a permanent magnet and means for providing an effective air gap between said permanent magnet and said field frame for restraining the amount of flux that the permanent magnet transmits to the field frame.

29. The dynamoelectric machine of claim 28, wherein said means for providing an effective air gap between said permanent magnet and said field frame comprises a non-magnetic support means between said permanent magnet and said field frame.

30. The dynamoelectric machine of claim 29, wherein said non-magnetic support means includes a support element secured to said permanent magnet and said field frame to keep said permanent magnet nearby said outer surface of said armature means to focus the effect of said permanent magnet on said armature means, whereby said non-magnetic support means effectively defines a relatively large air gap between the permanent magnet and said field frame in series with the air gap between the outer surface of said armature means and said main poles.

31. The dynamoelectric machine of claim 30, wherein said support element includes a perimetric ridge to surround said permanent magnet on all sides except the side facing said armature means.

32. The dynamoelectric machine of claim 28, wherein said main poles also include permanent magnet for establishing said magnetic field within said field frame, each of said permanent magnets for said main poles comprising:
- a concentric arc portion and a flared portion which together define a pole face having an arcuate face about a center line and a substantially flat face, wherein there is a line of intersection on said pole face where said arcuate face and said substantially flat surface meet and said substantially flat face extends from said arcuate face entirely to an edge of said permanent magnet defining said pole face.

33. The dynamoelectric machine of claim 32, wherein said substantially flat face is tangent to said arcuate face at said line of intersection on said pole face.

34. The dynamoelectric machine of claim 33, wherein said permanent magnets for said main poles are each substantially uniform in thickness throughout said concentric arc portion and said flared portion.

35. A direct current dynamoelectric machine comprising:
- a field frame of magnetic flux conductive material having means for establishing a magnetic field within said field frame provided on at least two main poles; and
- an armature rotatably disposed within said field frame having an armature winding thereon, said armature defining an air gap between an outer surface thereof and a pole face of each of said main poles, wherein said means for establishing a magnetic field includes a high-strength permanent magnet provided on each pole face of said main poles, each permanent magnet being of substantially uniform thickness throughout including a concentric arc portion that is substantially concentric along its face with said armature outer surface and a means for increasing the total of air gap and magnet thickness between the armature and the pole face of each main pole at an edge portion of each of the permanent magnets subject to a demagnetization force when said machine is loaded for resisting said demagnetization force, and further wherein said means for increasing the total of air gap and magnet thickness comprises a flared substantially flat surface on said pole face of each of the main poles beneath said edge portion of each of the permanent magnets to form an increasing gap toward the edge thereof and to increase the total of air gap and magnet thickness between said armature and said pole face of each of said main poles.

36. A direct current dynamoelectric machine comprising:
- a field frame of magnetic flux conductive material including means for establishing a magnetic field within said field frame, said means including at least two main poles;
- an armature means rotatably disposed within said field frame including an outer surface, which defines an air gap with faces of said main poles; and
- interpole means for improving commutation characteristics of said dynamoelectric machine connected to said field frame in at least one commutating zone between said main poles, said interpole means comprising a permanent magnet and including a non-magnetic support means between said permanent magnet and said field frame.

37. A high-strength permanent magnet for use in a direct current dynamoelectric machine having a field frame and an armature rotatably disposed therein with an air gap defined between an outer surface of the armature and main pole faces of the field frame, said permanent magnet to be secured to the field frame to produce a magnetic field in the field frame and to define at least a part of a main pole face, said permanent magnet comprising:

an arcuate magnet portion and a flared magnet portion which together define a pole face, said arcuate magnet portion providing an arcuate section of said pole face, and said flared magnet portion providing a flared section of said pole face for increasing the air gap toward an edge of said permanent magnet to be subject to a demagnetization force and thus the sum of the magnet thickness and air gap to resist said demagnetization force, wherein said flared magnet portion is of a substantially uniform thickness and said flared portion of said pole face extends from said arcuate portion of said pole face entirely to said edge of said permanent magnet to be subject to demagnetization force.

38. A high strength permanent magnet for use in a direct current dynamoelectric machine having a field frame and an armature rotatably disposed therein with an air gap defined between an outer surface of the armature and main pole faces of the field frame, said permanent magnet to be secured to the field frame to produce a magnetic field in the field frame and to define at least a part of a main pole face, said permanent magnet comprising:

an arcuate magnet portion and a means for increasing the air gap toward an edge of said permanent magnet to be subject to a demagnetization force and for thereby increasing the sum of the magnet thickness and air gap to resist said demagnetization force, said means comprising a flared magnet portion positioned adjacent to said arcuate portion at said edge subject to said demagnetization force, said arcuate magnet portion and said flared magnet portion together providing a pole face including an arcuate section and a flared section, respectively, wherein the sum of magnet thickness and air gap at said edge subject to demagnetization is at least as great as required to resist said demagnetization force, and the thickness of said arcuate magnet portion is no greater than the thickness of said flared magnet portion at said edge subject to said demagnetization force.

* * * * *